United States Patent [19]

Jonner et al.

[11] 3,883,184

[45] May 13, 1975

[54] MONITORING DEVICE FOR ANTI-LOCK CONTROL SYSTEM

[75] Inventors: Wolf-Dieter Jonner, Heidelberg; Heinz Leiber, Leimen; Wolfgang Korasiak, Ketsch, all of Germany

[73] Assignee: Teldix GmbH, Heidelberg, Germany

[22] Filed: June 26, 1973

[21] Appl. No.: 373,778

[30] Foreign Application Priority Data
June 30, 1972  Germany............................ 2232034

[52] U.S. Cl............................ 303/21 AF; 340/52 B
[51] Int. Cl.............................................. B60t 8/08
[58] Field of Search ............... 188/181; 303/20, 21; 340/52 R, 52 B

[56] References Cited
UNITED STATES PATENTS

| 3,650,574 | 3/1972 | Okamoto et al. | 303/21 AF |
|---|---|---|---|
| 3,707,311 | 12/1972 | Sharp | 303/21 CG |
| 3,759,582 | 9/1973 | Ohta et al. | 303/21 AF |

*Primary Examiner*—Trygve M. Blix
*Assistant Examiner*—Stephen G. Kunin
*Attorney, Agent, or Firm*—Spencer & Kaye

[57] ABSTRACT

A monitoring device for anti-lock control systems comprises a unit for monitoring the duration of the response of a brake pressure controlling element of the anti-lock control system which, when the response duration exceeds a predetermined time limit, acts on a second unit for generating a signal and a third unit receiving this signal and preventing the monitoring device from responding for a certain time period when certain wheel behaviour characteristics are present. According to an other feature the extension takes place when the signal occurs and in the certain time period an alternate reduction and build up of the brake pressure is caused.

17 Claims, 4 Drawing Figures

MONITORING DEVICE FOR ANTI-LOCK CONTROL SYSTEM

BACKGROUND OF THE INVENTION

The invention relates to a monitoring device for an anti-locking control system for vehicles, in which the response time of an electrically controlled brake pressure control member, influencing the pressure, is monitored and in which the anti-locking control system is made ineffective when control of the valve exceeds a predetermined duration.

Such a monitoring system is known, for example, from the German Disclosure Document No. 1,938,389. In this known system, the fact that a pressure control member of an anti-locking controller, e.g. an outlet valve (when inlet and outlet valves are used for brake pressure control), responds beyond a predetermined maximum time indicates that there is a fault in the control system. In this example using an outlet valve, the corresponding wheel brake would, without a monitoring device, remain without brake pressure for a relatively long time if such an error occurred. The response of the monitoring device after a predetermined time guarantees that, if an error occurs, the valve is de-energized and thus normal braking is effected without anti-lock control.

The determination of the maximum response time of the pressure control member must, on the one hand, be so large that, during actual control, any possible response times occuring as a result of correct operation of the control can be achieved without the monitoring device being allowed to respond, and on the other hand, small enough not to maintain too long the faulty influence on the brake pressure in the case where a fault occurs.

SUMMARY OF THE INVENTION

It is an object of the invention to improve the monitoring system in such a manner that a relatively short normal maximum response time can be used, whereby if a fault develops, faulty pressure control is maintained only for a relatively short period, but nevertheless any response of the monitoring system is prevented, if in special control cases, such as, during aquaplaning or on transition from a surface with a high coefficient of friction to one with a low coefficient of friction, a relatively long energization of the pressure control member is effected.

According to the invention, there is provided a monitoring device for an anti-lock-control system for vehicles comprising first means for monitoring the duration of the response of the brake pressure controlling element of said anti-lock control system second means for generating a signal if said first means indicates that said response duration is in excess of a predetermined time limit and third means which receives said signal and which then for a certain time period prevents the monitoring device from responding and thus from making the anti-lock control system ineffective if in addition a signal appears indicating certain behaviour characteristics of a wheel or wheel According to an other feature of the invention, there is provided a monitoring device for an anti-lock-control system for vehicles comprising first means for monitoring the duration of the response of the brake pressure controlling element of said anti-lock control system, second means for generating a signal if said first means indicates that said response duration is in excess of a predetermined time limit and third means which receives said signal and which then for a certain time period prevents the monitoring device from responding and thus from making the anti-lock control system ineffective and which causes alternate reduction and build up of the brake pressure during said time period.

BRIEF DESCRIPTION OF THE DRAWINGS

The invention will now be described in greater detail, by way of example, with reference to the drawings, in which.

DESCRIPTION OF THE PREFERRED EMBODIMENTS

Basically, therefore, the invention provides that the response of the monitoring device is prevented after the expiration of a first predetermined time span and firstly effects an alternate pressure reduction and build up for a further time span, whereby it is ensured that a complete pressure reduction does not take place and thus lead to ineffective brakes because of a fault. Then, after the expiry of the further time span — whether the occurrence for this operation has already been dispensed with — a check is made as to whether there is still a control signal requiring pressure reduction. If this is the case, after this second, relatively long time span, there is an error and no extreme road situation; the control system is now turned off. The alternate pressure reduction and build up can always be caused to operate if a valve is controlled in excess of the predetermined time span, but the initiation of the alternating operation — and not the immediate response of the monitoring device — can be further dependent on whether at least a signal characterizing the control behaviour of the wheel, such as, a slip signal or acceleration signal, is present and it can therefore be assumed that a special control case is present with the necessary long response of the pressure control member.

In accordance with a further preferred feature, a gate can be connected between the control of the pressure control member and a timing element which monitors the first time span. The gate, which is normally open, is blocked if an acceleration signal, derived from the associated wheel occurs and thus the measurement of the time span is interrupted until the signal disappears again. In addition, an upward extension of the limit of the response time of the monitoring device can be carried out in that the monitoring device can respond if the duration of a slip signal exceeds a predetermined time (e.g. 10 sec).

The extension of the response time or the monitoring device with the initiation of the alternating operation can be also undertaken in accordance with another form of embodiment if both a deceleration signal and a slip signal are derived from the controlled wheel or from the wheel group (e.g. the wheels of one axle). The extension can, in this case, last until the end of the slip signal.

In accordance with one possible embodiment of the invention, already mentioned above, the time span up to the response of the monitoring device is only extended and alternating operation initiated if a slip signal or a deceleration signal is derived from one of the separately controlled wheels of one axle, preferably of the non-driven axle. With the occurrence of only this one slip signal or deceleration signal, it is uncertain whether a system fault is present or not e.g. a failure of the comparator for the slip information or a breakdown of the frequency voltage transducer connected between sensor and comparator, has occurred. In order not to make the monitoring device respond at this time and on the other hand, to ensure that a wheel brake is not too long without pressure as a result of an incorrect slip signal or deceleration signal, namely until the extended response time has expired, which would result in yawing moments on the vehicle which the driver can only compensate for with difficulty, the wheel brakes of the wheels of one axle are operated during the extended response time in pulsed operation, i.e. that the brake pressure is alternately reduced for a short time and then is built up for a short time simultaneously at these wheels or at all the wheels. If a slip signal or an acceleration signal is obtained from both wheels, the probability that there is a system fault is less and this pulsed operation can be avoided here, i.e. suppressed, that is to say the response time of the monitoring device can be extended without pulsed operation. It is even more favourable to use the pulsed operation in a delayed manner when these signals occur.

If the pulsed operation is initiated in response to the pressure control member operating beyond the normal response time, with the simultaneous occurrence of a slip signal, this can be realized in a simple manner by providing that two feed lines, along which the slip signals are fed, are blocked periodically with the help of a timing member. At the end of the blocking period, the two lines are connected in parallel so that a pressure reduction takes place at both pressure control members as a result of the slip signal coming from one wheel, and so long until the normal response time of the valves has expired. The output signal of the timing circuit then appearing, reinitiates the blocking and so on. If the normal response time is chosen to be for example 150 msec., and the timing element for the blocking has a time constant of 100 msec., the pressure is built up (100 msec.) and reduced (150 msec.) in the rhythm 100 msec. to 150 msec. The end of the pulsed operation and the response of the monitoring device can be controlled by a further timing circuit, which measures, for example, the duration of the slip signals and emits an output signal which causes the safety circuit to respond if this slip signal lasts longer than a predetermined time. This can be for example 20 sec. The duration of this time is so chosen that a longer duration of the slip signals in a tractional drive vehicle cannot happen even in exceptional situations; thus the slip signal must be in error.

In accordance with another possible embodiment with the occurrence of slip signals from both wheels, the monitoring device must not respond in fact, but must simultaneously prevent, with the occurrence of both slip signals, the above-described pulse operation from starting; rather the normal separate control of the wheels should carry on, since a correct control case is assumed. Here the monitoring device responds if the slip signals last over the above-mentioned time of, for example, 20 sec.

In the case of another possible embodiment, the pulsed operation can be delayed. Then, if a deceleration signal is present, which is derived from one of the wheels before the expiry of the normal response time or if both slip signals are present, it is assumed here that there is no fault present. Here an abrupt change in the wheel-to-surface coefficient of friction must have taken place previously at the front wheel or the wheels must have reaccelerated after an abrupt change in coefficient of friction with very different accelerations. In this case, the slip signal is suitably allowed to act normally for a certain time, for example 1 sec., i.e. a pressure reduction is carried out. In order to avoid yawing moments, the pressure reduction is preferably carried out simultaneously for the brakes of both wheels. After this, the above-mentioned pulsed operation starts at both wheels. Preferably, this pressure reduction is undertaken only with road surfaces having a low coefficient of friction. The presence of a low coefficient of friction is detachable by measurement of the controlled pressure. Regarding the pulsed operation, it should be generally noted that an accelerometer, which may be present, and which can cause the maintenance of constant pressure or a reduction at one wheel, can maintain its effect so that a pressure build-up which is too great in the pressue build-up phase is prevented at low coefficients of friction.

In addition, the alternating operation can be initiated even with abrupt changes of the reference signal necessary for the slip measurement; such an abrupt change upwards would effect a really long pressure reduction.

Figure 1:
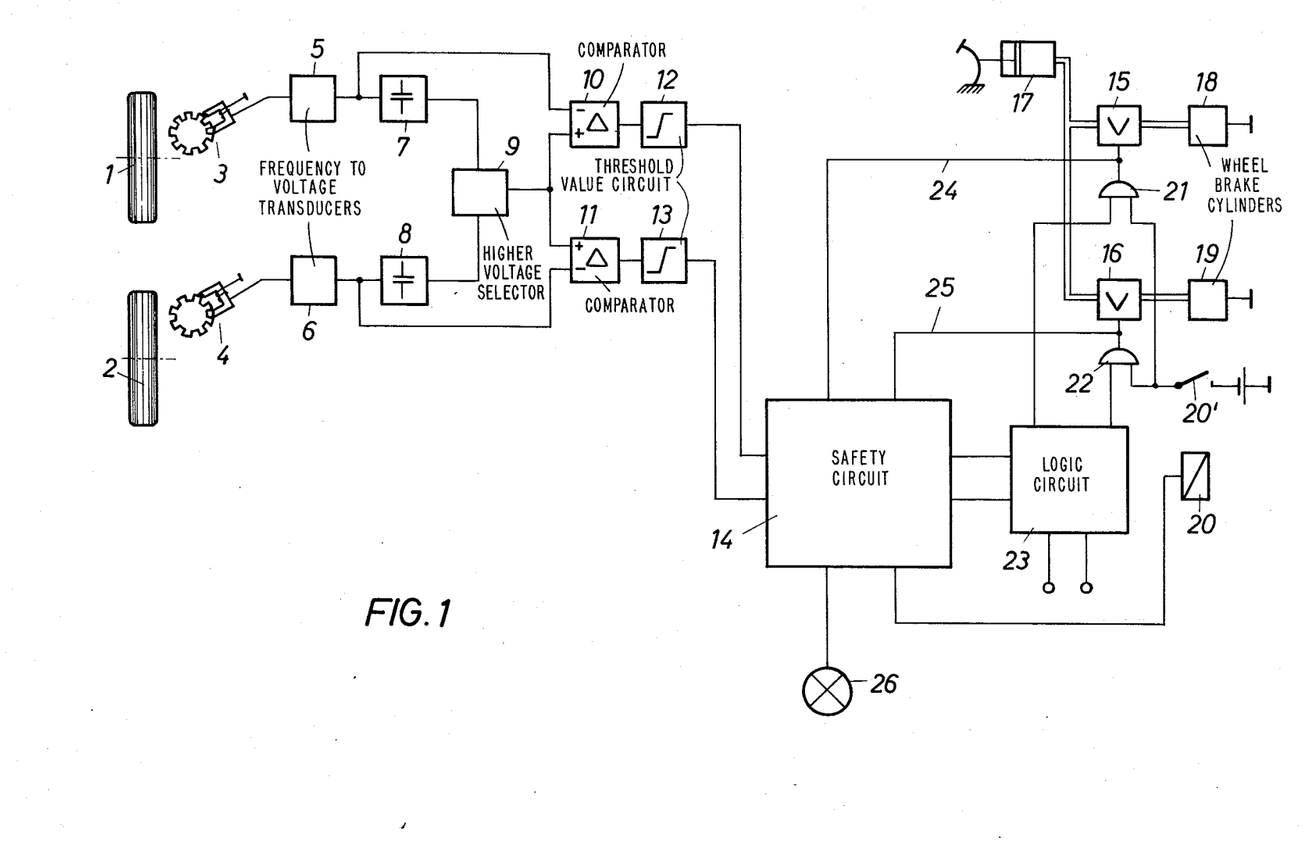
FIG. 1 shows the principle construction of an exemplary anti-lock control system with a connected-in monitoring device.

Referring to the drawings, in FIG. 1 the wheels of a front axle of a motor vehicle, driven by its rear wheels, are given the reference numerals 1 and 2. Speed sensors 3 and 4 are associated with these wheels. These speed sensors supply a pulse sequence, the pulse sequence frequency of which is proportional to the wheel speed, to frequency to voltage transducers 5 and 6. The output voltages of these transducers are proportional in their value to the rotational speed of the wheel and are fed to storage elements 7, 8, which are charged in accordance with the voltage applied, but are discharged with a predetermined time constant, whic corresponds for example to a braking deceleration of 1 g. The larger of the two output voltages of these storage elements serves as the "quasi"-vehicle speed. Here, a different storage element, e.g. with a switchable discharge time constant, can be used. The selection of the grater voltage is carried out by a circuit element 9, the output voltage of which is fed to the comparator circuits 10 and 11. Additionally, the voltage proportional to the associated wheel speed is also fed to these comparator circuits. At the output of the comparitor circuits 10 and 11 a difference voltage is present in each case which, if this difference voltage exceeds a predetermined threshold provided by threshold value circuits 12 and 13, that is to say indicates a tendency of the associated wheel to lock, is fed through a safety circuit 14 to a valve control logic circuit 23. The logic circuit 23 produces, if necessary, using deceleration and acceleration signals, signals which are fed to valve arrangements 15 and 16 for reducing the brake pressure. The valve arrangements 15 and 16 are located in the pressure line between the brake master cylinder 17 and the wheel brake cylinders 18 and 19 of the vehicle. A relay 20 is normally energised on switching on the vehicle ignition. The contact 20' is thus normally closed, so that, when control signals occur, these can pass to the valves 15 and 16 through the AND-gates 21 and 22 respectively.

It does not matter as far as the present invention is concerned, whether or not additional acceleration or deceleration signals can affect the valves via the logic circuit 23. Nor is it material how the valve arrangements 15 and 16 are constructed in detail, or whether as two-way valves or as an inlet-outlet valve combination.

In the case of the monitoring device in accordance with FIG. 1, the response durations of the valve arrangements 15 and 16 are monitored. If one of the valves is energized longer than a predetermined time of, for example, 150 msec. for an outlet valve and, for example, 600 msec. for an inlet valve, this duration is monitored by means of timing circuits in the monitoring device (through lines 24 and 25) and, on exceeding these times, the monitoring device responds immediately and the anti-lock control system is rendered ineffective unless the sensor signals present justify an extension of the response time limit. If such signals are not present, the energizing current for the relay 20 is blocked by the monitoring device. Thus the contact 20' opens and the AND-gates 21 and 22 prevent a further actuation of the valve arrangements 15 and 16 by signals on the control lines. The valves being without energising current, thus return to their starting position, in which only the master cylinder controlled pressure acts on the brake. This state of affairs can be maintained by the monitoring device in such a way that the control device can only be set in operation again if the error causing the long duration of the control signals is eliminated. The fact that the control has been rendered ineffective can be brought to the driver's attention by means of a warning device, for example the lamp 26.

The monitoring device 14 also responds if the slip signals coming from the threshold value stages 12 and 13 last longer than a predetermined time (of, for example 20 sec.). Thus the monitoring device 14 will respond after a slip signal duration in excess of the predetermined time limit (20 sec.), if it not yet has responded because of too long energization of the valves because of particular circumstances. The response time of the monitoring device is thus extended under special conditions and a pulsed operation is effective in this time. In addition, the control can be redered ineffective if similarly obtained acceleration or deceleration signals last in excess of a predetermined time (e.g. also 20 sec.) and thus indicate that there is a defect in these circuits which could cause faulty behaviour of the control system.

Figure 2:
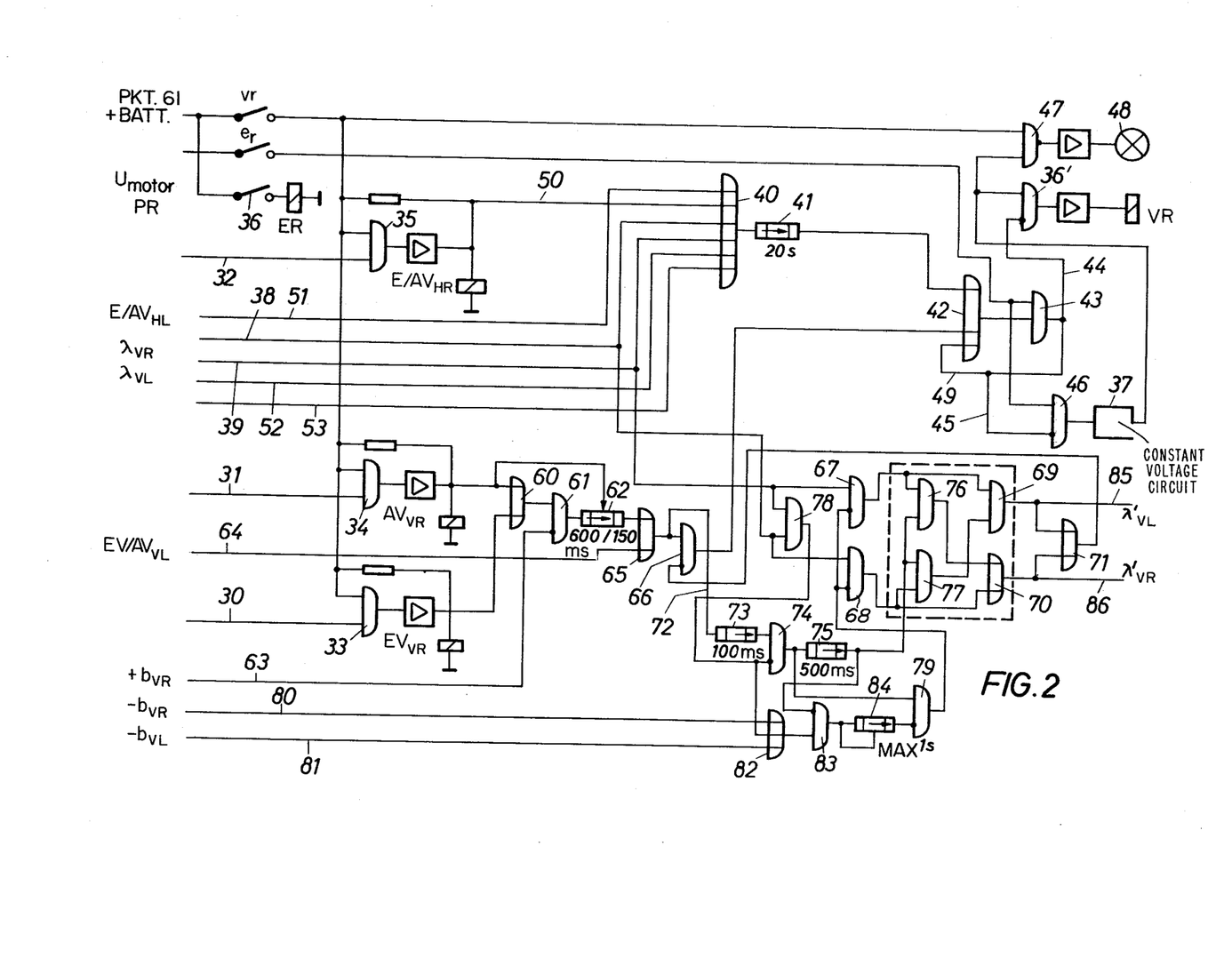
FIG. 2 shows a detailed representation of an exemplary embodiment of such a monitoring device.

FIG. 2 shows an embodiment of a monitoring system for an anti-locking control system which uses also acceleration and deceleration signals for the control, in addition to slip signals. The valve arrangements comprise, a normally open inlet valve and a normally closed outlet valve for each of the non driven front wheels. Brake pressure is maintained constant by energization of only the inlet valve; with the energization also of the outlet valve, the preseure in the wheel brake cylinder is lowered. On the rear wheels, an inlet/outlet valve is used which in a first position leaves the pressure uninfluenced but in its second position causes a pressure reduction in the wheel brake cylinder. For the sake of simplicity only the valves of one side of the vehicle side are shown in FIG. 2, that is to say the right-hand or off side. The inlet valve of the right-hand front wheel is given the reference $EV_{VR}$, the associated outlet valve $AV_{VR}$ and the inlet-outlet valve of the right-hand rear wheel $E/A\ V_{HR}$. The control of these valves is effected through lines 30, 31 and 32 of the electronic control unit not shown. An AND-gate 33, 34 and 35 is connected into the control line in each case. When contact $vr$ is closed, the AND-gates are connected to the +pole of the battery. On the occurence of a control signal on one of the lines 30 and 32, the associated valve is thus energized through the associated amplifier.

If the contact 36 is closed by actuation of the ignition switch, the relay ER is energized. This relay ER closes contact $er$. With closing of this contact, a signal is applied to the input of the AND-gate 43. Since the second input of this AND-gate 43 receives a signal only when a fault situation is present, normally no signal is present at its output. However, because of the negator at one input of the AND gate 36' a signal is then produced. The second input of the AND-gate 36' also receives a signal from the output of a circuit 37 maintaining a constant voltage. Relay VR, closes contact $vr$ and applies a voltage on one side to the AND-gates 33 to 35 to cause the valves to respond.

The two slip signals from the front wheels, when present are fed, along lines 38 and 39. These signals are fed through an OR-gate 40 to a timing circuit 41 which, after a predetermined time of, for example, 20 sec. supplies an output signal to an OR-gate 42. The output signal of this OR-gate 42 is applied to one input of the AND-gate 43, to the other input of which is fed a signal by means of the contact $er$ (as already stated). The appearance of a signal at the output of the OR-gate 42 has the consequence that the AND-gate 36' is blocked through the line 44. In addition, the battery is disconnected from the device for maintaining the voltage constant through a line 45 and the negated input of an AND-gate 46. With this, the output voltage of the circuit 37, for maintaining the voltage constant disappears and thus the input voltage of the AND-gate 36 also disappears. Both measures let the valve relay VR deenergise, open the contact $vr$ and the valves $EV_{VR}$, $AV_{VR}$ and $E/A_{HR}$ (and naturally also the other valves not shown) are deenergised, thus rendering the control ineffective. Since, moreover, the input signals of an AND-gate 47 with a negated output disappear, voltage is applied to the warining lamp 48. Finally this state is maintained by the feedback line 49 even after the end of the output signal of the timing circuit 41, thus there is storage of this state until the ignition switch 36 is opened.

As FIG. 2 shows, in the embodiment chosen, the control is also rendered ineffective if the inlet-outlet valve $E/A_{VR}$ of the right-hand rear wheel was energized longer than the predetermined time of 20 sec. (line 50 to OR-gate 40). Line 51 which is connected to the inlet-outlet valve (not shown) of the left-hand rear wheel in a corresponding manner, corresponds to the line 50.

Finally, in addition the acceleration and deceleration signals of the two front wheels (e.g. coming from an accelerometer with an inert mass) are coupled via the lines 52 and 53 to the OR-gate 40, so that these signals also lead to the control being rendered ineffective if these signals last longer than the predetermined time.

The response of the monitoring device and thus the rendering of the control, ineffective is now to be considered if the outlet valve $AV_{VR}$ of the right-hand front wheel or of the corresponding valve (not shown) of the left-hand front wheel responds for a predetermined time or the inlet valve $EV_{VR}$ of the right-hand front wheel or the corresponding valve of the left-hand front wheel responds for another longer time. The two valves $EV_{VR}$ and $AV_{VR}$ are, for this purpose, connected by via an OR-circuit 60 and an AND-circuit 61 to a timing circuit 62, which has a reversible delay time and, for example, when the energisation of the outlet valve $EV_{VR}$ lasts over 150 msec or the energisation of the inlet valve $EV_{VR}$ lasts over 600 msec. provides an output signal. When an acceleration signal from the associated wheel appears at the line 63, the appearance of an output signal from the timing element 62 is prevented by the AND-element 61.

An output signal from the timing circuit 62 and a corresponding signal from the other front wheel circuitry (line 64) are fed via an OR-gate 65 to an AND-gate 66 and, if no signal is fed to its other input, the signals are fed further to the OR-gate 42 where they cause an immediate response of the monitoring device. This immediate response of the monitoring device on energization of the valves EV and AV for the predetermined (short) time is, however, prevented as long as at least one slip signal is present which is derived from one of the two front wheels. For this purpose the two slip lines 38 and 39 are connected through AND-gates 67 and 68, each second input of which is negated and through OR-gates 69 and 70 to an OR-gate 71, so that when a slip signal is present, the gate 66 is blocked and thus the immediate response of the monitoring device is prevented. However, the output signal of the OR-gate 65 simultaneously affects, through a line 72, a timing circuit 73 with a delayed operation an AND-gate 74 with its second input negated and the timing circuit 75 with the delayed operation, that the AND-gates 76 and 77 are rendered conductive for signals coming through the AND-gates 67, 68. Together with the OR-gates 69 and 70, these AND-gates 76 and 77 provide a parallel connection of the two slip lines, if a signal appears at the output of the timing circuit 75. As well be shown later, this parallel circuit is effective if an output signal from the OR-gate 65 appears and both slip signals do not appear simultaneously. When both slip signals appear, an output signal appears at the AND-gate 78 and the AND-gate 74 blocks the output signal of the gate 65. The output signal of the AND-gate 74 moreover still arrives at the AND-gate 79, the other input of which is negated. If no signal appears at this other input, the output signal of the AND-gate 79 blocks the AND-gates 67 and 68. A blocking of the AND-gate 79 takes place if, shortly before the appearance of an output signal from the AND-gate 74, either a wheel deceleration signal has arrived from the front wheels through one of the lines 80 and 81 or a signal indicating the presence of both slip signals has arrived at the OR-gate 82. Deceleration signals and a signal indicating the presence of both slip signals, which appear after the appearance of the output signal from the timing circuit 75 have no effect because the AND-gate 83 is blocked. A signal appearing before the presence of the "parallel-connected" signal is extended in the timing circuit 84 by a predetermined time of, for example, 1 sec. and then this signal blocks the AND-member 79. The outputs of the OR-gates 69 and 70, on the lines 85 and 86, or fed to the evaluation circuit of the anti-locking controller. The gates 67 and 68 and 69, 70 are thus connected in the feed lines for feeding the slip signals to the evaluation circuit.

The operation of the lower half of the circuit of FIG. 2 is as follows:

1. If the outlet valve $AV_{VR}$ of the corresponding valve of the other wheel is energized for 150 msec. (and correspondingly the inlet valve is energised for 600 msec.) and no slip signal is present on the lines 38 and 39, then the monitoring device responds immediately. It is assumed that here there is an error in the control.

2. If an outlet valve is energized for the said time and a slip signal appears but previously no deceleration signal or no slip signals were present from both wheels, then it is not clear whether a defect can be assumed; the monitoring device thus does not respond immediately, but only after 20 seconds, if the slip signal lasts that long. In the course of these 20 seconds, first the AND-gates 67 and 68 are blocked by the output signal of the AND-gate 79 and thus no slip signal is allowed through to the evaluation circuit. Together with this, the control signal for the outlet valve which has been energised in excess of the predetermined time is cut off if no deceleration signal is present. This state of affairs is maintained because of the time period (100 msec.) predetermined by the timing circuit 73. After this time, the blocking signal for the AND-circuits 67 and 68 is cut off. On account of the output signal of the timing circuit 75 with a time constant (e.g. 500 msec.) longer than the time constants of the timing elements 73, and the AND-circuits 76 and 77 are prepared for the passage of a slip signal, ie. one of these AND-gates is rendered conductive for a slip signal which appears. The parallel circuit is thus made effective and a slip signal appears on both lines 85 and 86 until, after 150 msec. (circuit 62), the AND-gates 67 and 68 are blocked. For 20 seconds both wheels are simultaneously subjected alternately to a pressure build-up (100 msec.) and a pressure reduction (150 msec.). A premature rendering of the control ineffective should be prevented by this measure, since, in this state, it is not certain whether there is a fault. On the other hand, the occurrence of large yawing moments during this test period is prevented by the simultaneous control of both brake cylinders. After 20 seconds the monitoring device finally responds through the timing circuit 41.

3. If one of the outlet valves is energized for longer than 150 msec. and both wheels supply slip signals, it can be assumed that the long period of valve energisation is justified. Immediate response of the monitoring device is prevented by blocking of the AND-gate 66. The blocking and the parallel connection of the slip lines is prevented by means of AND-gate 78 and the gate 74 (thus no pulsed operation effected). The slip signals thus arrive unhindered at the evaluation circuit. If the signals last 20 seconds, then the monitoring device again responds.

4. If an outlet valve is energized for longer than 150 msec., a slip signal is present, and a deceleration signal from the front wheels (lines 80 and 81) has appeared before the appearance of the output signal at the timing circuit 62, or both slip signals have been present, the timing circuit 84 responds when a signal appears at the output of the OR-gate 82. It blocks the AND-gate 79, for example for 1 second from the end of the signal or from the appearance of the output signal of the timing circuit 62, and thus prevents, for this period, the blocking of the AND-gates 67 and 68. However, the parallel circuit (elements 76, 77, 69, 70) is rendered effective through the output signal of the timing circuit 62, so that the pressure at both wheels is reduced for, at maximum 1 second. Finally, if the slip signal is still present, it provides the alternate reduction and increase of the brake pressure simultaneously at both wheels. Previously the slip signal prevented the immediate response of the monitoring device. With the slip signal remains, the monitoring device responds after 20 sec. The behaviour described can occur with the occurrence of an abrupt change in the coefficient of friction at a front wheel or after an abrupt change in the coefficient of friction on both sides and the wheels reaccelerate differentially.

Figure 3:
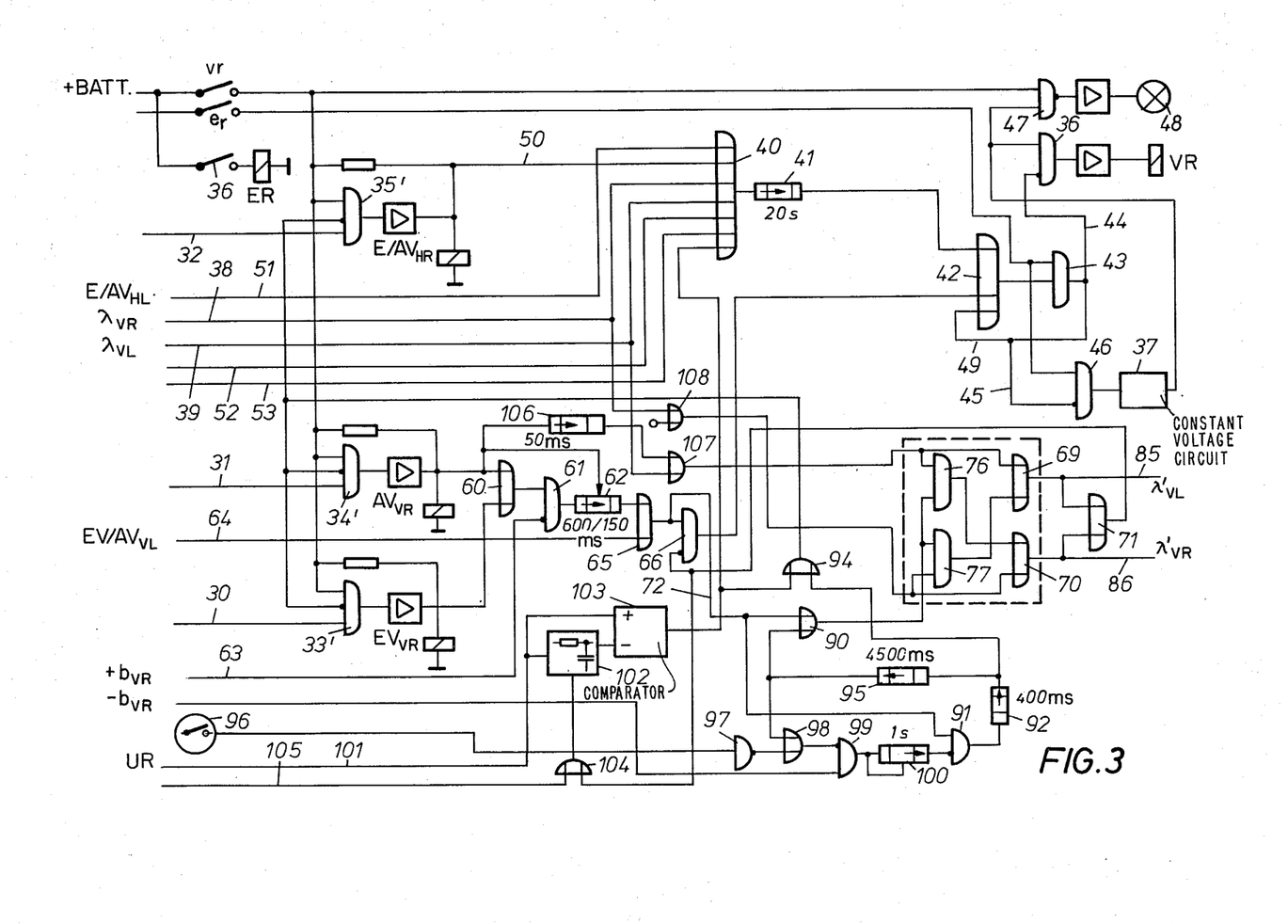
FIG. 3 shows a variant of the circuit of FIG. 2.

A few small developments relative to FIG. 2 will now be described with reference to FIG. 3. FIG. 3 is however described only in the senses in what it differs from FIG. 2. Where no change has been made, the individual elements have the same reference numerals.

Whereas in the case of the embodiment of FIG. 2 the pulsed operation of the wheels did not take place after the expiry of 150 msec. or 600 msec., if λ signals were derived from both front wheels, in the exemplary embodiment of FIG. 3 the pulsed operation is initiated also in this case. Gates 78 and 74 are not provided. Rather, here with the appearance of the output signal of the OR-gate 65 through the OR-gate 90, the parallel circuit of the two λ -lines are effected by the AND-gates 76, 77 and the OR-gates 69 and 70. Simultaneously the output signal of the OR-gate 65 blocks the AND-gates 33', 34' and 35' through AND-gate 91 the timing circuit 92 with its output signal delayed by about 400 msec. and the OR-gate 94 and thus cuts off the valves for, for example, 400 msec. After the end of the output signal of the timing circuit 92, the valves, if the control signals are still present, can again be actuated, that is to say, respond again for 150 msec. and so on. As compared with the solution of FIG. 2, here too valve E/AV$_{HR}$ of the rear wheels is included in the pulsed operation. The parallel circuit of the two λ-lines through the elements 69, 70 and 76, 77 remains maintained for some time through the timing element 95. The carrying out the pulsed operation in the extended time for the response of the monitoring device is solved somewhat differently here too. For the sake of completeness it should be mentioned that the extension of the response time of the monitoring device also takes place here only if at least one λ-signal is present (through OR-gate 71).

IN the cae of the embodiment of FIG. 2 a deceleration signal $-b_{vr}$ or $-b_{vL}$ present at a front wheel and which appeared shortly before the expiry of the maximum valve response time, causes the pulsed operation to be delayed for, for example 1 second, and brake pressure reduction to take place. Since such a long pressure reduction at a large coefficient of friction and for example in city traffic can be too long, this displacement of the pulsed drive is undertaken only at a low coefficients of friction in the present exemplified embodiment.

For this purpose a brake pressue sensor switch 96 is provided, which closes only at high pressures, e.g. 30 atmospheres gauge. At a low coefficient of friction μ the controlled pressure is low and the switch 96 is not closed. A signal is simulated through the negating element 97, which signal then holds the AND-gate 99 ready through the OR-gate 98 and the negated input, so that a deceleration signal $-b_{vr}$ can delay the initiation of the pulsed operation for a maximum of 1 sec. by means of the timing circuit 100 which corresponds to the timing circuit 84 of FIG. 2.

Finally in FIG. 3 still further monitoring of the reference voltage of the circuit 9 of FIG. 1 is introduced in steps. This reference voltage is fed through the line 101 to the storage element 102. The storage voltage follows the fed voltage in a delayed manner. The element still has a reversible time constant, at the high value of which the voltage present up to the opening time point is stored or is only slightly reduced. Switching on of the high time constant is effected through the OR-gate 104, if either a λ-signal occurs or a response of the valves is signalled through line 105.

The stored voltage is compared with the instantaneous value of the reference voltage in the comparator circuit 103. If the instantaneous value suddenly exceeds the stored voltage, the storage element 102 cannot change its voltage quickly enough and the comparator 103 emits an output signal which blocks the valves through the AND-gate 94. This blocking ends if the output signal of the comparator 103 is dispensed with. Simultaneously, this signal acts through the OR-gate 40 on the timing circuit 41 so that the monitoring device responds after 20 sec. This prevents a false brake pressure reduction by such a short-time jump of the reference voltage. The pulsed operation cannot be effective with the occurrence of this signal which has priority.

In accordance with a further development of the invention, after the control element (outlet valve) associated with one wheel and acting to reduce the brake pressure, has been controlled for a time period (e.g. 50 msec.) shorter than the time period up to the start of the alternating pressure effect, a signal is produced which is used for releasing the pressure reduction caused by the corresponding control element of the other wheel of the same axle. Yawing moment of the vehicle should be prevented by this arrangement, which is of interest particularly in the case of heavy vehicles. Thus still, for a predetermined time, the outlet valves particularly of the front axle, are connected in parallel before the alternating pressure variation takes place. In the embodiment of FIG. 3 this basic idea is realized by a further timing circuit 106 (delay of, for example, 50 msec.) connected to the control of the outlet valve AV$_{VR}$ for the right-hand front wheel, the output signal of which is fed into the line 39 through the OR-gate 107; this signal influences the outlet valve (not shown) associated with the left-hand wheel, through the line 85 and reduces the brake pressure at the left-hand wheel brake. A corresponding timing circuit is also connected to the outlet valve (not shown) of the left-hand front wheel. Its output signal is fed into the line 38 through the OR-gate 108 and influences the outlet valve of the right-hand front wheel.

Figure 4:
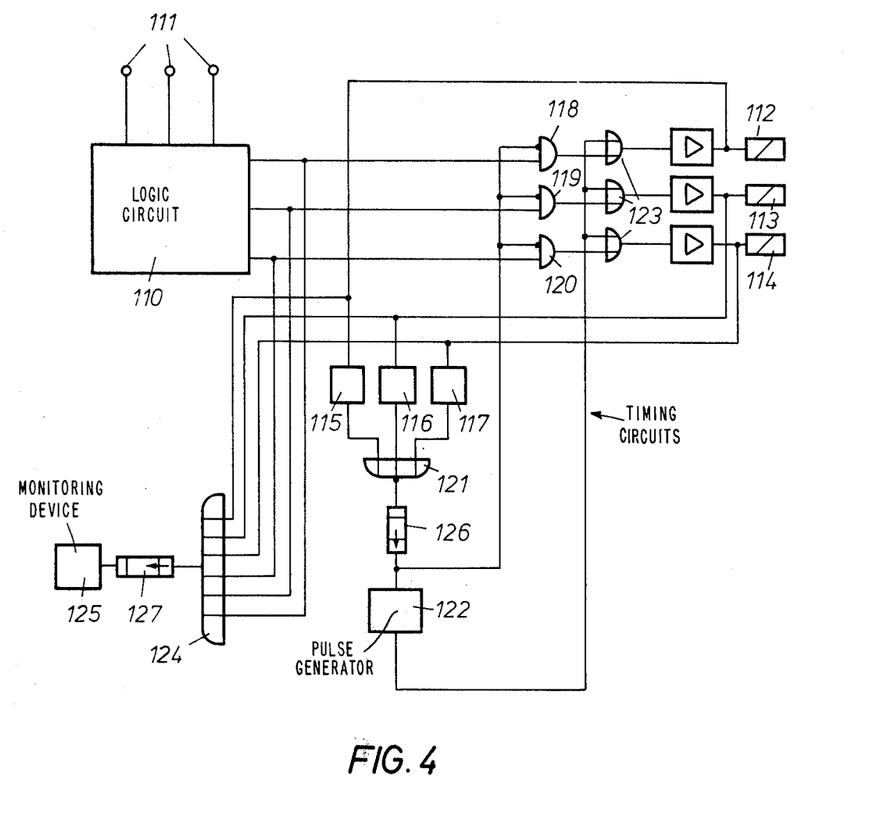
FIG. 4 shows a monitoring system designed basically differently as compared with FIGS. 2 and 3.

FIG. 4 shows a further embodiment of the invention. A logic circuit 110 is provided, to which are fed, by the terminals 111, rotary speed signals from the two front wheels and from the driven axle which has a common control. Control signals for the valve arrangements 112–114, associated with the wheel brakes, for controlling the brake pressure, are obtained in the logic unit 110 from the rotary speed signals using a slip measurement and/or rotary deceleration and/or acceleration.

Although for the sake of simplicity of the drawing only one two-way valve each is indicated, which permits the brake pressure to increase in one position and reduces it in the other, valve arrangements comprising — as in FIGS. 2 and 3 — also an inlet and an outlet valve can be used.

The response time of valves 112 to 114, that is to say the duration of the pressure reduction, is monitored by the timing circuits 115 to 117. If one of the valves responds longer than a predetermined time (e.g. 150 msec.) then the reason for this can be that there is a fault. However, special road conditions can also be the reason for this. Therefore a fault should not yet be signalled so that the monitoring device responds. On the other hand it should be ensured that the vehicle brakes are not completely cut off. Therefore, the vehicle brakes, that is to say here all, are actuated for a certain further time in a pulse operation, i.e. the brake pressure is alternately built up and reduced until either the fault disappears and normal control operation becomes effective or the extension period expires and the monitoring device responds and eliminates every control operation, that is to say deenergises all the valves. AND-gates 118 to 120 are connected in the lines to the valves 112 to 114 to achieve the control operation, which gates 118 to 120, because of their negated inputs, normally allow going through of the control signals, but with the appearance of a signal at the output of the timing circuits 115 to 117 and thus at the output of the OR-gate 121, the control signals are blocked for a time predetermined by the timing circuit 126. Simultaneously, the pulse generator 122 is actuated for this time period, which actuates the valves 112 to 114 through the OR-gates 123 so that pressure build-up and pressure reduction occur alternately. The pulse pause relationship must in this case be suitable selected. If no output signal of the timing elements 115 to 117 is present at the end of the time period of the timing circuit 126, normal control operation becomes effective again; otherwise the pulsed operation runs on renewed until a control signal for the valves 112 to 114 or a valve energization lasts longer than e.g. 20 sec.; then the timing element 127 responds through the OR-gate 124 and causes the monitoring device 125 to respond, which completely switches off the control and/or can generate a warning — as in FIGS. 2 and 3.

It will be understood that the above description of the present invention is susceptible to various modification changes and adaptations.

What is claimed is:

1. A monitoring device for an anti-lock control system for vehicles comprising: first means for monitoring the duration of the response of the brake pressure controlling element of said anti-lock control system, second means for generating a control signal if said first means indicates that said response duration is in excess of a predetermined time limit, third means responsive to said control signal for causing the anti-lock control system to become ineffective, fourth means for generating an output signal if one vehicle wheel exhibits a slip of a given value, and fifth means to which the output signal from the fourth means is fed, for supressing the effect of said control signal on said third means for a certain time period upon the occurrence of said output signal from said fourth means.

2. A monitoring device for an anti-lock control system for vehicles comprising: first means for monitoring the duration of the response of the brake pressure controlling element of said anti-lock control system; second means for generating a signal if said first means indicates that said response duration is in excess of a predetermined time limit; and third means, which receives said signal, for causing the anti-lock control system to become ineffective after a given further period of response of said brake pressure controlling element and for causing alternate reduction and build up of the brake pressure during said further period.

3. A device as defined in claim 2 and comprising fourth means responsive to a slip signal derived from at least one wheel for controlling said third means to provide said alternate reduction and build up only when said slip signal is present.

4. A device as defined in claim 3, and comprising lines by means of which slip signals derived from individual wheels are fed to said control system and fifth means for periodically blocking said lines and for connecting them in parallel to produce said alternate reduction and build up of pressure.

5. A device as defined in claim 4, wherein said fifth means is prevented from blocking said lines when both slip signals are present.

6. A device as defined in claim 2 wherein said first means are ineffective when an acceleration signal derived from any wheel whose brake is controlled by said control system is present.

7. A device as defined in claim 2, wherein said control system controls the non-driven wheels of the vehicle separately.

8. A device as defined in claim 2, wherein said third means causes said alternate reduction and build up of brake pressure of the wheel brakes of the wheels of an axle with the same timing.

9. A device as defined in claim 2, wherein said third means is prevented from causing said alternate reduction and build up of pressure if a signal requiring pressure variation at both wheels brakes of the wheels of one axle is present.

10. A device as defined in claim 2, wherein said third means delays the start of said alternate reduction and build up of the brake pressure for a predetermined period if a signal indicates a deceleration of a wheel or wheel slip of both wheels of an axle are present to enable a common brake pressure reduction to take place at both wheel brakes.

11. A device as defined in claim 10, and comprising means for rendering said delay of the start of said alternate reduction and build up of pressure effective only when the vehicle is on a road surface with a low coefficient of friction.

12. A device as defined in claim 2, and comprising a warning device operative when the said control system is rendered ineffective.

13. A device as defined in claim 2, wherein said second means causes said control system to remain ineffective even after said first means ceases to indicate an excess duration.

14. A device as defined in claim 2, wherein said third means causes said extension of said predetermined time limit to end after said further period by measuring the duration of control signals.

15. A device as defined in claim 2, wherein said third means causes said alternate reduction and build up of the brake pressure for the brakes of all wheels of the vehicle.

16. A device as defined in claim 2, comprising comparison means for comparing a delayed reference signal associated with slip control with its instantaneous value for detecting abrupt changes in said reference signal, and means for producing a signal for blocking control of all control valves as long as said instantaneous value of said reference signal exceeds the value of said delayed reference signal by a predetermined amount.

17. A device as defined in claim 2, and comprising means for causing the control signal applied to one pressure reduction valve also to be applied to the pressure reduction value of the other wheel of an axle, the said additional application begins some time before the predetermined time period ends and ends with the beginning of the alternate reduction and build up of pressure.

* * * * *

UNITED STATES PATENT OFFICE
CERTIFICATE OF CORRECTION

PATENT NO. : 3,883,184
DATED : May 13th, 1975
INVENTOR(S) : Wolf-Dieter Jonner et al It is certified that error appears in the above-identified patent and that said Letters Patent are hereby corrected as shown below:

In the heading of the patent, under [73] Assignee, change "Teldix" to --TELDIX--.

In the Abstract, line 10, change "an other" to --another--.
Column 1, line 61, after "or wheel" insert --group--; line 62, change "an other" to --another--.
Column 2, line 61, change "or" to --of--.
Column 3, line 55, after "this" insert --time--.
Column 4, line 28, change "pressue" to --pressure--; line 46, change "whic" to --which--; line 51, change "grater" to --greater--; line 56, change "comparitor" to --comparator--.
Column 5, line 49, change "redered" to --rendered--; line 64, change "preseure" to --pressure--.
Column 6, line 50, change "warining" to --warning--.
Column 7, line 2, delete the comma after "control"; line 9, delete "by"; line 44, change "well" to --will--.
Column 8, line 1, change "or" to --are--; line 31, delete "and".
Column 9, line 46, after "out" insert --of--; line 53, change "IN" to --In--, change "cae" to --case-- and change "decelara" to --decelera--; line 62, change "efficients" to --efficient; line 64, change "pressue" to --pressure--.
Column 11, line 36, change "suitable" to --suitably--; line 62, change "supressing" to --suppressing--.
Column 12, line 39, change "wheels" (first occurrence) to --wheel--; line 45, change "indicates" to --indicating--; line 46, change "are" to --is--.
Column 13, line 1, before "comprising" insert --and--.

Signed and Sealed this
sixth Day of January 1976

[SEAL]

Attest:

RUTH C. MASON
Attesting Officer

C. MARSHALL DANN
Commissioner of Patents and Trademarks